(No Model.)
G. R. KENT.
VENDER'S WAGON.
No. 432,533. Patented July 22, 1890.
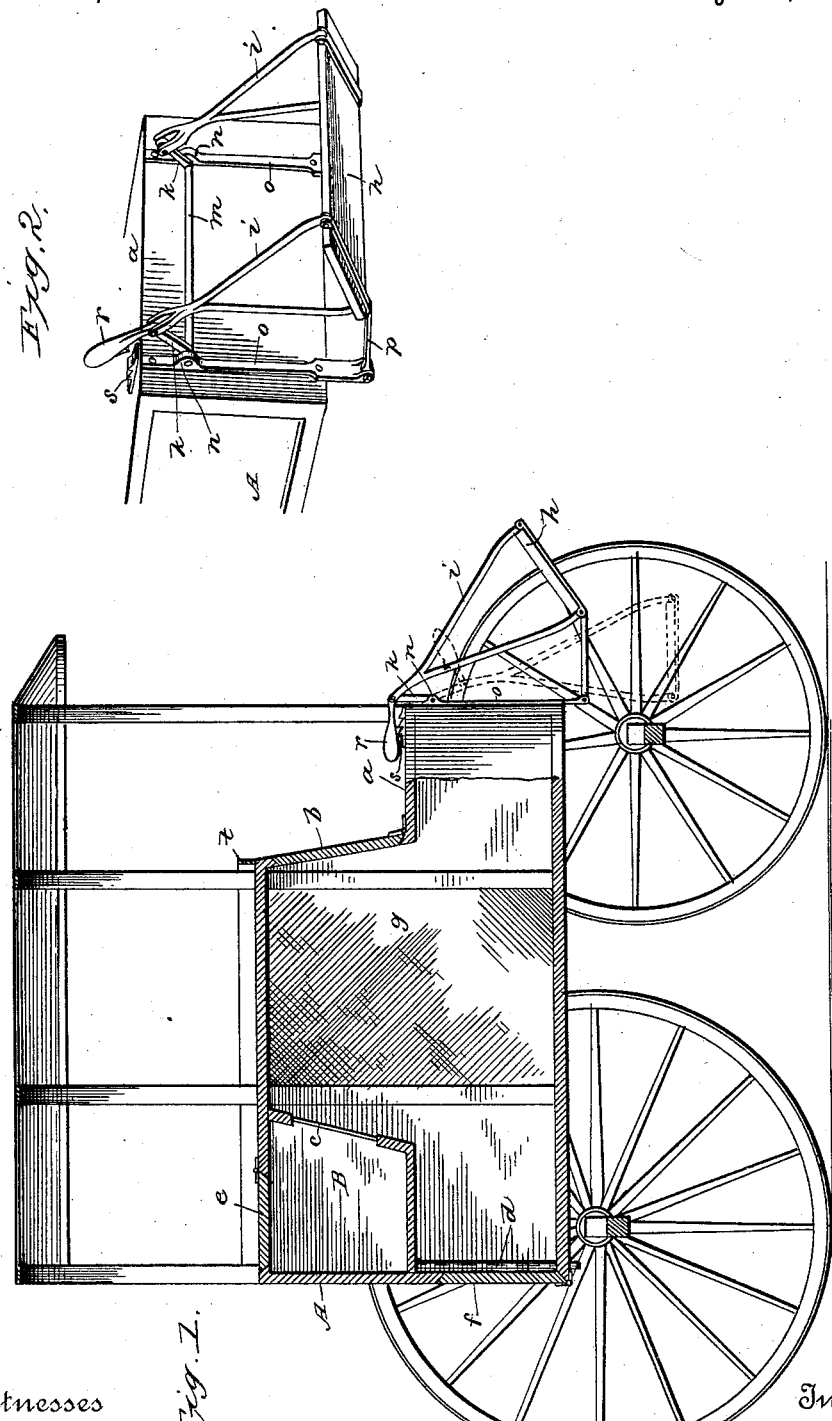

UNITED STATES PATENT OFFICE.

GEORGE R. KENT, OF BURLINGTON, WISCONSIN, ASSIGNOR TO A. F. RANSOM, OF SAME PLACE.

VENDER'S WAGON.

SPECIFICATION forming part of Letters Patent No. 432,533, dated July 22, 1890.

Application filed January 9, 1890. Serial No. 336,422. (No model.)

*To all whom it may concern:*

Be it known that I, GEORGE R. KENT, a citizen of the United States, residing at Burlington, in the county of Racine and State of Wisconsin, have invented certain new and useful Improvements in Venders' Wagons, of which the following is a specification, reference being had therein to the accompanying drawings.

My invention has for its object to provide a convenient refrigerator-wagon for traveling venders of meat, butter, fish, &c., of such construction that customers may be served by the driver without requiring the latter to get down from the wagon, the said wagon being provided in front with a swinging or adjustable foot-rest, which may be lowered to serve as a platform on which the driver can stand when obtaining access to the chamber of the wagon through a door located at the front part of the wagon just back of the driver's seat.

In the drawings, Figure 1 is a longitudinal sectional view of my improved wagon, and Fig. 2 is a perspective view of the front end of the body thereof to show the adjustable foot-rest and platform.

The body A of the wagon consists of a frame-work suitably inclosed and preferably lined with zinc, which may be readily washed off to keep the interior clean. This body is formed low in front to make a seat $a$ for the driver, and at the back of the seat is a door $b$, serving as a back for the seat and admitting of ready access to the cooling-chamber of the wagon from the front, said door being so arranged that it may be turned down on the seat $a$ to form a table on which meat, &c., may be handled and cut.

B is an ice-chest arranged at the upper side of the rear end of the wagon-body A, said ice-chest communicating with the cooling-chamber through a suitable slat-work or other open-front portion $c$, and being provided with a drain-pipe $d$ to carry off the water formed by the melting ice. A door $e$ at the top of the ice-chest permits of access thereto.

The body A is provided at its rear end below the ice-chest with a door $f$, which may be used in loading or unloading wagon, and which is of proper size to permit a pail of water to be dashed into the cooling-chamber when opened to wash out said chamber, the location of said door at the bottom of the rear end of the wagon permitting the water to run out readily when the forward end of the wagon-body is slightly raised.

The central panel $g$ of the wagon-body consists, preferably, of double glass windows with air-spaces between, so that the contents of the interior of the cooling-chamber may be readily inspected from the outside without opening the doors.

The wagon-body is provided in front with a swinging or adjustable foot-rest and platform, which is adapted to serve as a foot-rest and dash-board when raised and as a step or platform on which the driver may stand when serving a customer when lowered. To this end the foot-rest and platform proper $h$ is sustained by rods or bars $i$, pivoted at their upper ends to the arms $k$ of a shaft $m$, suitably attached to the front of the wagon-body, preferably by being journaled in ears $n$ of bars $o$, secured to said front. To the lower ends of the bars $o$ are jointed rigid links $p$, which are also jointed to the platform $h$. A suitable handle $r$ is provided by which the rock-shaft $m$ may be operated to raise or lower the platform, said handle being formed, preferably, as a spring or gravity catch adapted to engage with a suitable holding device, as ratchet $s$, on the wagon-body.

From the foregoing it will be clear that the swinging platform may be held in the raised position shown in Fig. 2 and in full lines, Fig. 1, to serve as a foot-rest for the driver, or may be lowered to the position shown in dotted lines, Fig. 1, to serve as a platform on which the driver may stand when obtaining access to the front part of the wagon through the front door $b$ and serving a customer.

The deck of the cooling box or chamber is preferably surrounded by a railing $t$, and thus provides a receptacle for tools, cutting block or board, scales, paper, &c., thereby providing a convenient working-room above said chamber or box.

The doors of the cooling-chamber and ice-box will be held closed by suitable buttons or spring-catches, and provision will be made in any well-known way for proper ventilation through the ice-box and cooling-chamber.

My improved wagon is more particularly intended, by being lightly made, for a onehorse vehicle; but may be made larger and heavier, if desired, for a double team.

It is obvious that my improved adjustable foot-rest and platform may be applied to other forms of wagons than refrigerator-wagons.

Having thus described my invention, I claim and desire to secure by Letters Patent—

1. A vender's wagon comprising a body constructed to form a cooling-chamber provided with an ice-receptacle, said body having a seat in front and being provided forward of said seat with an adjustable or swinging foot-rest and platform adapted to be raised and lowered, substantially as set forth.

2. The combination, with the wagon-body A, of the rock-shaft $m$, attached to the forward end thereof and provided with arms, the rods or bars $i$, jointed to said arms, and the platform or foot-rest $h$, sustained by said rods or bars, substantially as set forth.

3. The combination, with the wagon-body A, of the bars $o$, attached to the front end of said body and having ears $n$, the rock-shaft $m$, journaled in said ears and provided with arms $k$, and an operating and securing handle, the rods or bars $i$, jointed to said arms, the platform $h$, sustained by said rods or bars, and the links $p$, jointed to said bars $o$ and to said platform, substantially as set forth.

4. A wagon-body provided at its forward end with a seat, and having in front of said seat an adjustable foot-rest and platform adapted to be raised and lowered bodily to different heights, combined with a securing-catch for holding said platform elevated so as to serve as a foot-rest, substantially as set forth.

5. A vender's wagon having a body consisting of an inclosed chamber, the forward end of which is depressed to form a seat, said body having a substantially vertical door behind said seat serving as a back therefor and arranged to be turned down on the seat to form a working-table, an ice-receptacle in the rear upper portion of said inclosed chamber, and a door at the rear end of the said body below the said ice-receptacle, substantially as set forth.

In testimony whereof I affix my signature in presence of two witnesses.

GEORGE R. KENT.

Witnesses:
A. F. RANSOM,
K. P. RANSOM.